United States Patent [19]
Martin et al.

[11] Patent Number: 5,637,173
[45] Date of Patent: Jun. 10, 1997

[54] METHOD FOR FORMING A RETROREFLECTIVE STRUCTURE HAVING FREE-STANDING PRISMS

[75] Inventors: David C. Martin, Berlin; Edward D. Phillips, Oakville, both of Conn.

[73] Assignee: Reflexite Corporation, Avon, Conn.

[21] Appl. No.: 88,252

[22] Filed: Jul. 7, 1993

Related U.S. Application Data

[63] Continuation of Ser. No. 18,766, Feb. 17, 1993, abandoned.

[51] Int. Cl.⁶ .................. B29D 11/00; B32B 31/12; B32B 31/18; G02B 5/122
[52] U.S. Cl. .................. 156/235; 156/230; 156/237; 156/247; 156/249; 156/250; 156/271; 156/289; 156/297; 264/1.9; 359/529
[58] Field of Search .................. 156/247, 60, 150–151, 156/71, 230–235, 237–241, 248–249, 276, 278, 280, 289, 297–298, 324, 236, 250, 271; 359/530–534, 536–541, 529; 264/1.9

[56] References Cited

U.S. PATENT DOCUMENTS

| | | |
|---|---|---|
| 2,380,447 | 7/1945 | Jungersen . |
| 3,684,348 | 8/1972 | Rowland . |
| 3,689,346 | 9/1972 | Rowland . |
| 3,810,804 | 5/1974 | Rowland . |
| 3,811,983 | 5/1974 | Rowland . |
| 3,830,682 | 8/1974 | Rowland . |
| 3,935,359 | 1/1976 | Rowland . |
| 3,971,692 | 7/1976 | Anderson .................. 156/241 |
| 3,975,083 | 8/1976 | Rowland . |
| 4,075,049 | 2/1978 | Wood .................. 156/234 X |
| 4,202,600 | 5/1980 | Burke et al. . |
| 4,243,618 | 1/1981 | Van Arnam . |
| 4,244,683 | 1/1981 | Rowland . |
| 4,349,598 | 9/1982 | White .................. 359/530 X |
| 4,721,649 | 1/1988 | Beliste et al. .................. 156/276 X |
| 4,801,193 | 1/1989 | Martin . |
| 5,050,924 | 9/1991 | Hansen .................. 52/3 X |
| 5,084,782 | 1/1992 | Taylor .................. 359/530 X |
| 5,117,304 | 5/1992 | Huang et al. .................. 359/530 X |
| 5,171,624 | 12/1992 | Walter . |
| 5,202,168 | 4/1993 | Turner et al. .................. 359/530 X |
| 5,207,852 | 5/1993 | Lightle et al. .................. 156/230 |
| 5,223,312 | 6/1993 | Langille .................. 359/530 X |
| 5,264,063 | 11/1993 | Martin .................. 156/247 |
| 5,491,586 | 2/1996 | Phillips .................. 359/530 |

FOREIGN PATENT DOCUMENTS

| | | |
|---|---|---|
| 1303103 | 1/1973 | United Kingdom . |
| 2255313 | 11/1992 | United Kingdom . |
| WO93/10985 | 6/1993 | WIPO . |

OTHER PUBLICATIONS

*Webster's New World Dictionary*, 3rd ed.: Simon & Schuster Inc., New York NY, 1988, p. 1369.

Primary Examiner—Adrienne C. Johnstone
Attorney, Agent, or Firm—Hamilton, Brook, Smith & Reynolds, P.C.

[57] ABSTRACT

A retroreflective structure is described in which an array of free-standing retroreflective prisms is formed on a suitable substrate for application of the structure to pre-existing structure formed of compatible fabrics, such as tarpaulins.

16 Claims, 2 Drawing Sheets

METHOD FOR FORMING A RETROREFLECTIVE STRUCTURE HAVING FREE-STANDING PRISMS

RELATED APPLICATION

This is a Continuation application claiming priority to Ser. No. 08/018,766 filed Feb. 17, 1993, now abandoned.

BACKGROUND OF THE INVENTION

Retroreflective materials are commonly employed for safety and decorative purposes. One type of retroreflective material is formed of molded members having very small prisms or cube corner formations. (See, for example, U.S. Pat. No. 3,810,804.)

It is often desirable to apply these materials to pre-existing structures; in which case, the retroreflective material may not be compatible with the material of the pre-existing structure or the method of application may be destructive of the retroreflective properties.

A need exists, therefore, for a retroreflective system and process in which the retroreflective material may be fabricated to facilitate permanent transfer to existing structures of different material without damaging the retroreflective material.

SUMMARY OF THE INVENTION

A method and apparatus for forming retroreflective material on a substrate is described in which a release coating is formed on a base material and an array of free-standing solid light transparent prisms are formed on the coating by casting the prism array with a plastic oligomer which is adhered to the coating.

The prisms are then made reflective by forming a metal layer on the prisms. An adhesive is then applied to the reflective metal layer. A substrate is then applied to the adhesive and the base material is removed at the release coating, leaving an exposed array of free-standing prisms, i.e., prisms with a reflective metal backing affixed to the substrate.

The substrate is preferably formed of the same material as the structure upon which the retroreflective material is to be secured or is compatible with such structure. For example, the substrate may comprise a sheet of synthetic resin, such as polyvinylchloride (PVC), polyamide, polypropylene, polycarbonate, or fabrics such as polyester, nylon, or the like, coated with a suitable resin.

Preferably, the substrate with the exposed prism layer may then be covered with a transparent protective layer on the exposed side and the substrate may then be bonded by various well-known techniques to a pre-existing structure of the same or similar material as the substrate.

DETAILED DESCRIPTION OF THE INVENTION

The invention will now be described in detail in connection with the drawings. Referring to FIGS. 1A–1F, a preferred embodiment will be described in which the substrate comprises tarpaulin material. This is a particularly appropriate example, since a need exists for a simple and inexpensive method of attaching retroreflective material to truck tarpaulins for safety reasons.

Figure 1A:
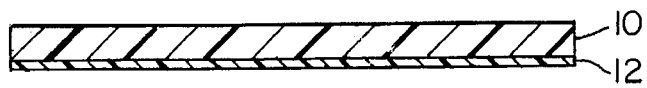
FIGS. 1A–1F are process flow schematic cross-sectional views showing the main steps in the fabrication of the retroreflective material of the invention on a substrate.

As shown in FIG. 1A, the starting structure consists of base sheet 10 of material, such as a polyester sheet with an acrylic print treatment on one side (sold by DuPont under the name J Film). A release coating 12 formed of a polyester solvent borne tie cast is applied to the treated side of a 1–4 mils thick sheet 10.

Figure 1B:
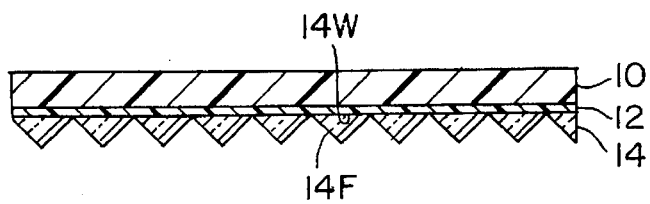

Next, as shown in FIG. 1B, an array of free-standing microprisms 14, about 2.8 mils high, is formed on the release coating by casting the prism array with an epoxy or urethane oligomer and adhering it to the coating. The prisms have a facet side 14F and a window side 14W.

Preferably, the prisms are of the type formed of cube corners in which the 3 faces intersect at 90° angles and in which the optical and prism axis are coincident, although non-perfect cube corner prisms to achieve special optical effects are within the contemplation of this invention.

Figure 1C:
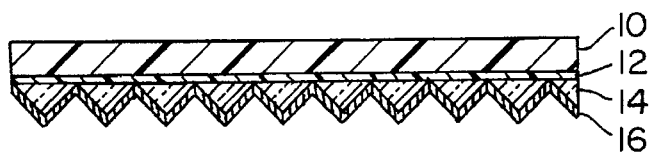

The prisms 14 are made reflective by coating the exposed prisms surface with a reflective layer, such as a metal layer 16, such as aluminum, gold or silver of about 500–800 Å (FIG. 1C).

Figure 1D:
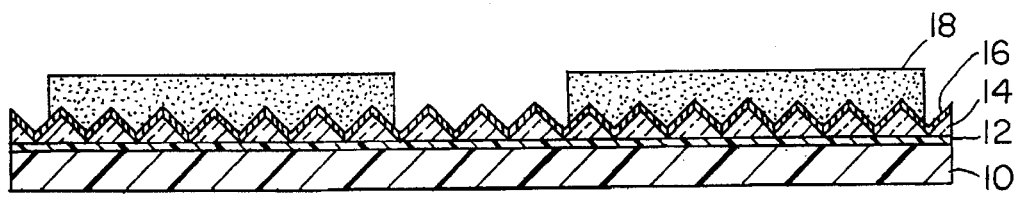
Figure 1E:
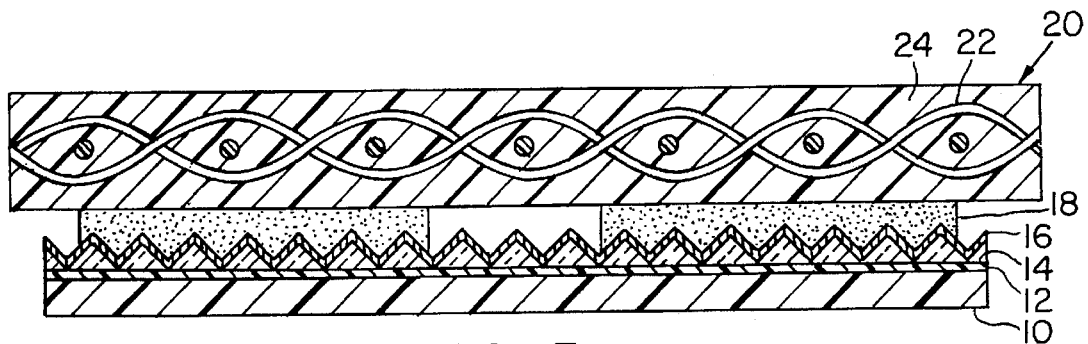

The structure of FIG. 1C is inverted and an adhesive, such as a one component moisture curing reactive poly-urethane adhesive 18 (sold by MACE Corp.) is applied to the metallized prism side in a continuous stripe format of about 50 mm stripe length (FIG. 1D).

The substrate 20, shown here as a tarpaulin material formed of a polyester cloth 22 encapsulated by a plastic material 24, is then laminated to the adhesive 18 (FIG. 1E) and the base sheet 10 is stripped away (FIG. 1D).

Figure 1F:
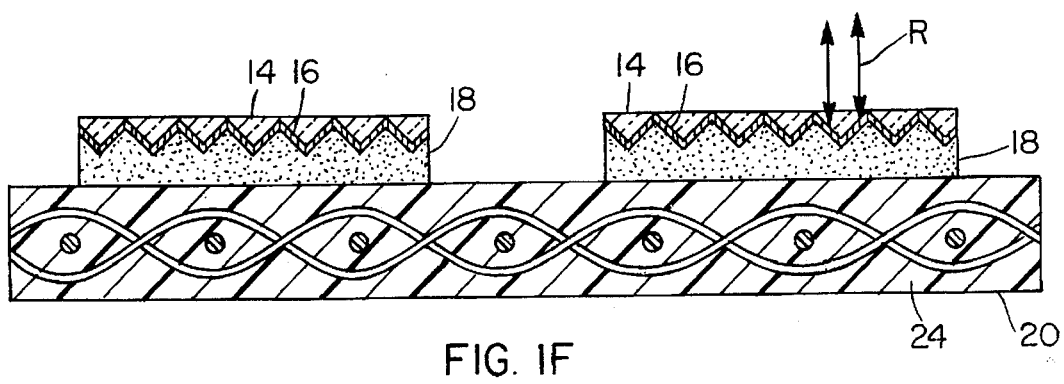

This leaves stripes of an array of exposed (free) retroreflective prisms 14 adhered to the substrate 20 by adhesive 18 (FIG. 1F). Light rays R incident upon the face of the prism 14 are retroreflected back by surface 16.

Figure 2:
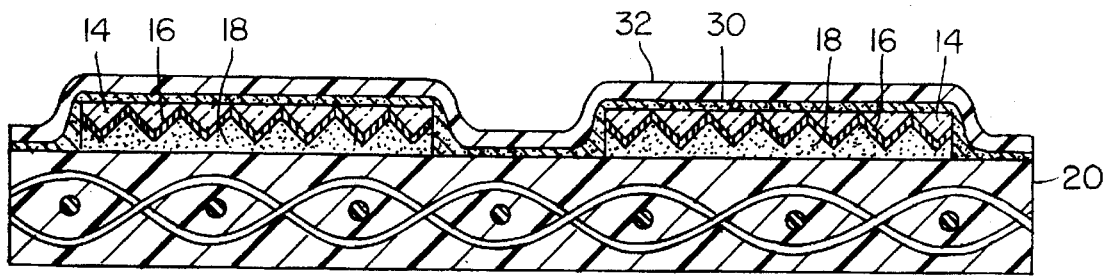
FIG. 2 is a schematic cross-section showing further modification to the FIGS. 1A–1F embodiment.
Figure 3:
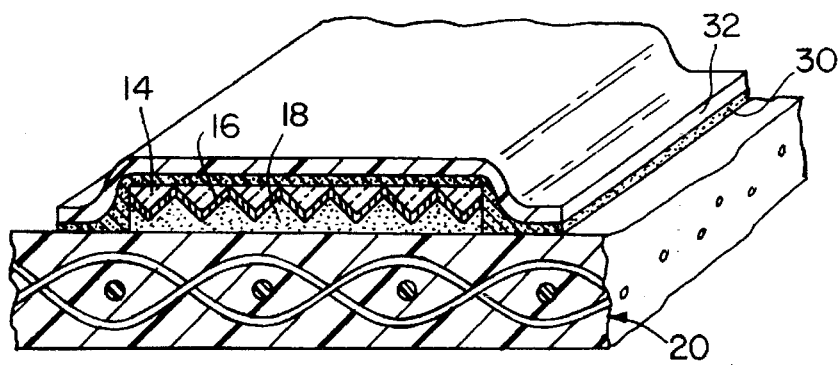
FIG. 3 is a schematic perspective showing a tape formed in accordance with the invention.

The resultant structure shown in FIG. 1F may be further processed, as shown in FIG. 2, by coating the free prism side with a light transparent adhesive 30 and laminating a clear protective sheet 32 of material, such as polyvinyl, to the structure. The structure shown in FIG. 2 may then be slit into strips to form tapes, as shown in FIG. 3.

Figure 4:
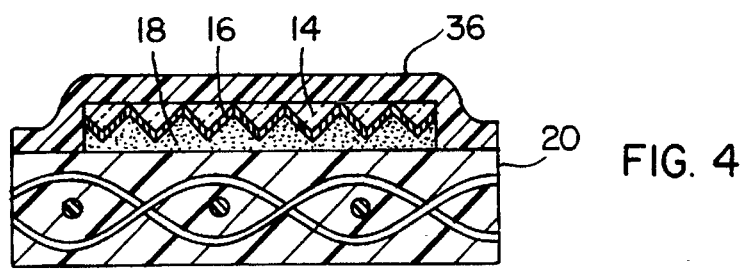
FIG. 4 is a section showing an alternate tape embodiment of the invention.

Alternately, as shown in FIG. 4, the free prism side shown in FIG. 1F may be coated with a material 36 adapted to form a good bond with both the substrate 20 and the free prisms 14.

For example, if the substrate is formed of tarpaulin with an acrylic lacquer coating, then an elastomeric urethane coating would be a good choice for material 36.

Other substrate materials may comprise fabric reinforced plastic, fabric reinforced and embossed vinyl, coated vinyl, urethanes, polypropylenes and the like.

Figure 5:
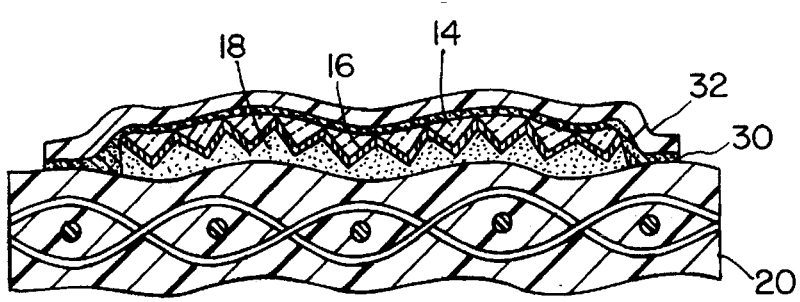
FIG. 5 is a detailed sectional view showing the prism orientation.

As shown in FIG. 5, an important feature of the present invention is that the prisms 14, because they are relatively free to move, become somewhat oriented by the shape of the substrate material 20, which improves the retroreflected light distribution.

The invention claimed is:

1. A method for forming a retroreflective structure having free-standing prisms, comprising the steps of:
   a) applying a release coating over a side of a sheet of base material;
   b) temporarily adhering an array of transparent free-standing prisms having a facet side and a window side to the coated side of the sheet of base material with the window side of said prisms abutting said sheet and the facet side exposed;
   c) forming a reflective layer on the exposed facet side of said prisms while adhered to said sheet, thus rendering the prisms retroreflective;
   d) adhering a substrate to the facet side of the free-standing retroreflective prisms; and
   e) removing the sheet of base material with the release coating leaving the window side of the free-standing retroreflective prisms exposed, thereby forming the retroreflective structure having free-standing prisms.

2. The method of claim 1 wherein the transparent free-standing prisms are cube-corner prisms.

3. The method of claim 1 wherein the substrate is formed of a material selected from the group consisting of tarpaulin, fabric reinforced and embossed vinyl, coated vinyl, urethanes, and polypropylenes.

4. The method of claim 1 wherein after step e) the retroreflective structure is cut into strips to form tapes.

5. The method of claim 1 wherein a light transparent adhesive coating is applied to the window side of the free-standing retroreflective prisms and a light transparent protective layer is adhered thereto.

6. The method of claim 1 wherein the transparent free-standing prisms are formed with an epoxy or urethane.

7. A method for forming a retroreflective structure having free-standing prisms, comprising the steps of:
   a) applying a release coating to a sheet of base material;
   b) forming an array of transparent free-standing prisms having a facet side and a window side on the release coating with the window side of said transparent free-standing prisms abutting the release coating and the facet side exposed;
   c) forming a reflective layer on the exposed facet side of said transparent free-standing prisms, thus rendering the prisms retroreflective;
   d) adhering a substrate to the reflective layer on the facet side of the free-standing retroreflective prisms;
   e) removing the sheet of base material leaving the array of free-standing retroreflective prisms on the substrate, whereby the window side of said free-standing retroreflective prisms is exposed; and
   f) covering the exposed window side of the free-standing retroreflective prisms with a transparent protective sheet, thereby forming the retroreflective structure having free-standing prisms.

8. The method of claim 7 wherein the transparent free-standing prisms are cube-corner prisms.

9. The method of claim 7 wherein the protective sheet is formed of a polyvinyl material.

10. The method of claim 7 wherein the substrate is formed of a tarpaulin material.

11. The method of claim 7 wherein the transparent free-standing prisms are formed with an epoxy or urethane.

12. A method for forming a retroreflective structure having free-standing prisms, comprising the steps of:
   a) forming an array of transparent free-standing cube-corner prisms on a sheet of base material to which has been applied a release coating, wherein said prisms have a facet side and a window side and wherein the window side abuts the release coating;
   b) forming a reflective layer on the facet side of said transparent free-standing cube-corner prisms, thus rendering the prisms retroreflective;
   c) adhering a substrate to the reflective layer using a transparent adhesive;
   d) removing the sheet of base material leaving the retroreflective free-standing cube-corner prisms with a reflectively coated facet side on the substrate, whereby the window side of said retroreflective free-standing cube-corner prisms is exposed; and
   e) covering the window side of the retroreflective free-standing cube-corner prisms with a transparent protective sheet, thereby forming the retroreflective structure having free-standing prisms.

13. The method of claim 12 wherein the formed retroreflective structure is slit into tapes.

14. The method of claim 12 wherein the transparent free-standing cube-corner prisms are formed with an epoxy or urethane.

15. A method for forming a tarpaulin having a retroreflective structure, comprising:
   a) forming an array of transparent free-standing prisms having a facet side and window side on a sheet of base material;
   b) forming a reflective layer on the facet side of the transparent free-standing prisms, thus rendering the prisms retroreflective;
   c) applying a substrate in the form of a tarpaulin material to the reflective layer with an adhesive;
   d) removing the sheet of base material leaving the array of transparent retroreflective free-standing prisms on the tarpaulin material substrate, whereby the window side of the retroreflective free-standing prisms is exposed, thereby forming the retroreflective structure; and
   e) bonding the tarpaulin material substrate to a tarpaulin of a material the same as, or compatible with, the substrate, thereby forming the tarpaulin having a retroreflective structure.

16. The method of claim 15 wherein the window side of the retroreflective free-standing prisms is further covered with a transparent protective sheet and the retroreflective structure is cut into strips to form tapes before step e).

* * * * *